United States Patent [19]
Perez et al.

[11] Patent Number: 5,732,654
[45] Date of Patent: Mar. 31, 1998

[54] OPEN AIR MARICULTURE SYSTEM AND METHOD OF CULTURING MARINE ANIMALS

[75] Inventors: Carlos E. Perez; Max L. Hunter, both of Guayaquil, Ecuador

[73] Assignee: The First Republic Corporation of America, New York, N.Y.

[21] Appl. No.: 730,853

[22] Filed: Oct. 17, 1996

Related U.S. Application Data

[60] Provisional application No. 60/005,723 Oct. 20, 1995.
[51] Int. Cl.⁶ .................................................. A01K 63/04
[52] U.S. Cl. ............................................................. 119/204
[58] Field of Search ................................... 119/204, 200, 119/207, 215, 234

[56] References Cited

U.S. PATENT DOCUMENTS

| | | | |
|---|---|---|---|
| 4,052,960 | 10/1977 | Birkbeck et al. | 119/200 |
| 4,182,267 | 1/1980 | Kominami et al. | 119/200 |
| 4,202,291 | 5/1980 | Kominami et al. | 119/200 |
| 4,517,084 | 5/1985 | Pincon | 119/200 |
| 5,593,574 | 1/1997 | Vantoever | 210/150 |

FOREIGN PATENT DOCUMENTS

| | | |
|---|---|---|
| 29 33 324 | 3/1981 | Germany. |
| 3-180 132 | 8/1991 | Japan. |
| 1 291 457 | 10/1972 | United Kingdom. |

*Primary Examiner*—Thomas Price
*Attorney, Agent, or Firm*—Darby & Darby

[57] ABSTRACT

A mariculture system and method of culturing marine life with polluted source water. The system includes a water replenishment reservoir, activated carbon and ozone purification devices, a device for removing toxic byproducts of ozonation of salty or brackish (bromine-containing) water, and ponds for the culture of marine animals. The method includes obtaining water containing compounds and organisms detrimental to marine animal life, treating the water so it is suitable for the culture of marine animals, and raising and harvesting marine animals in the treated water.

28 Claims, 14 Drawing Sheets

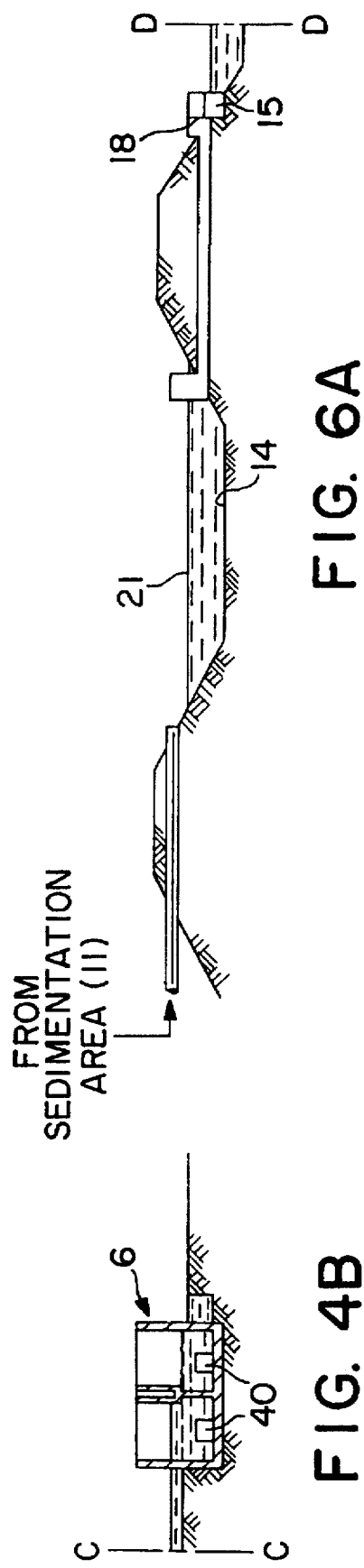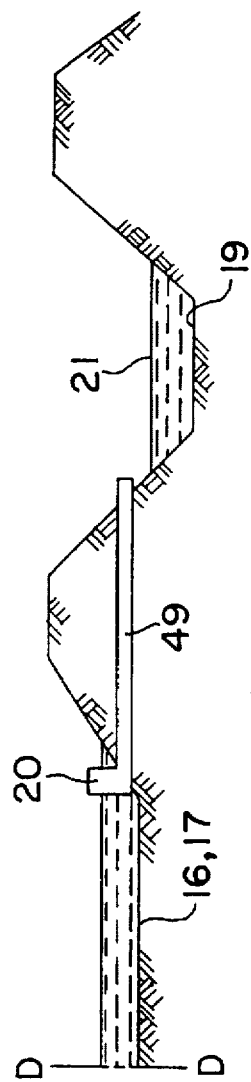

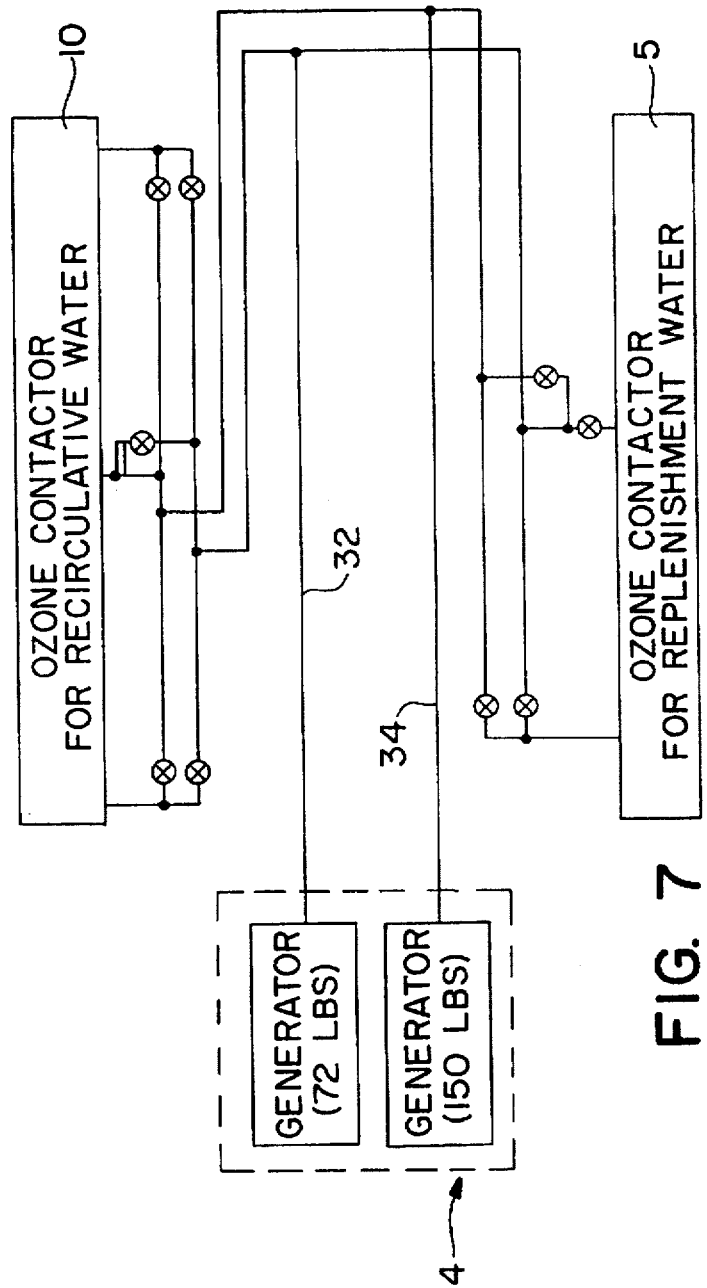
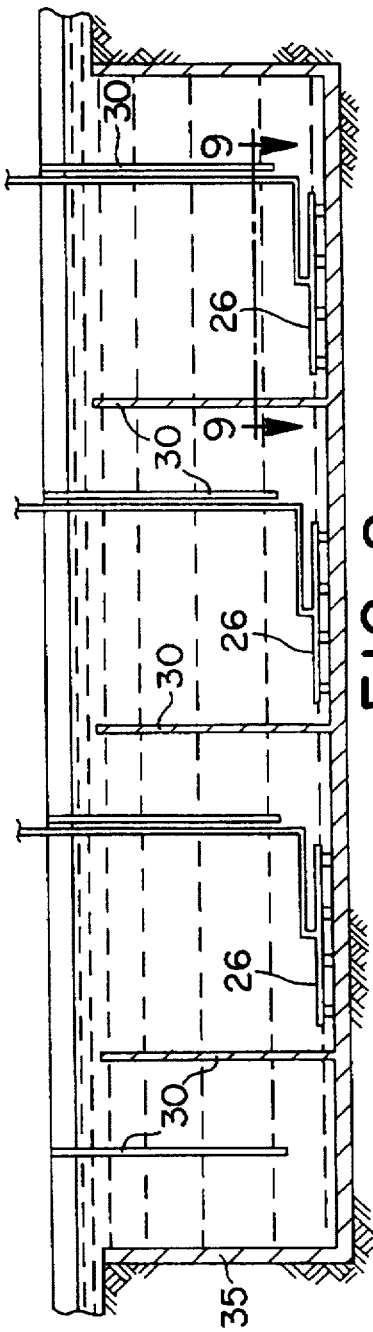
FIG. 7
FIG. 8

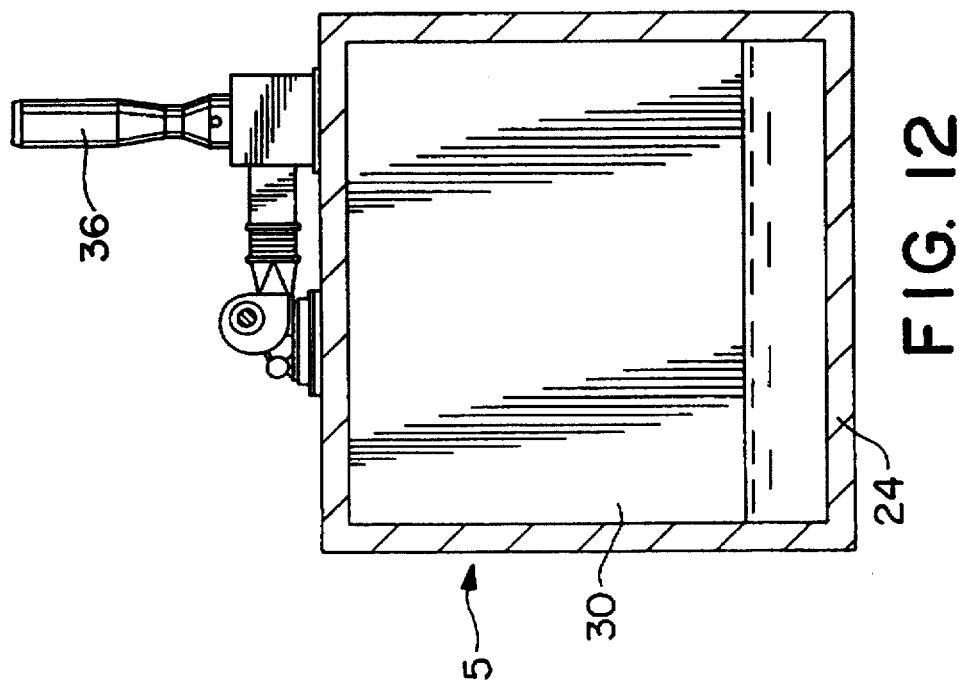
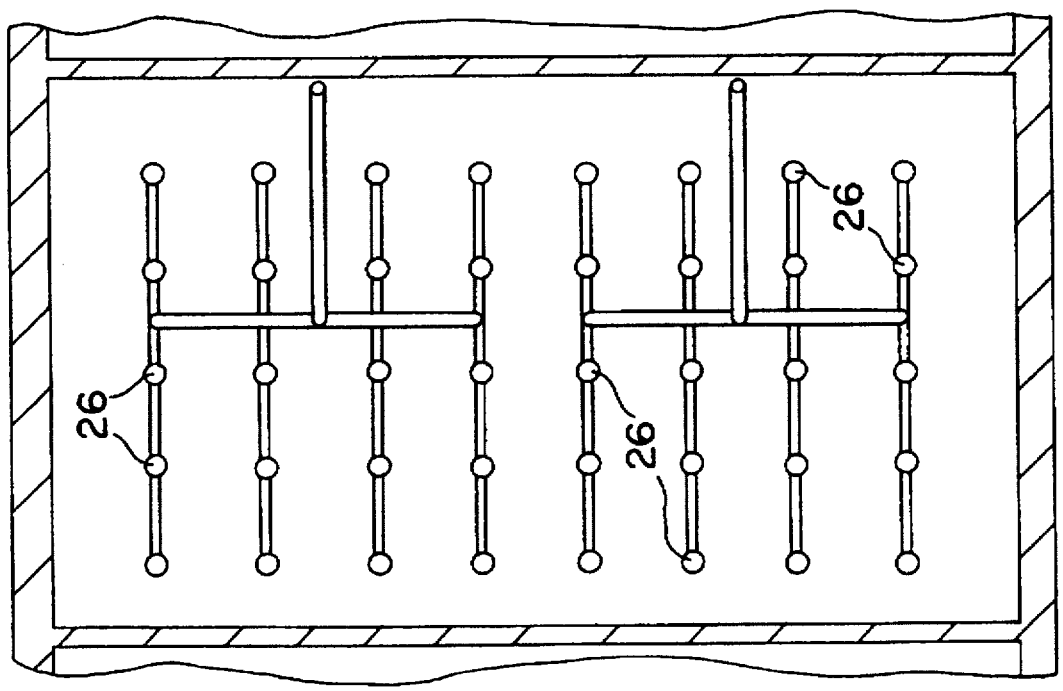

OPEN AIR MARICULTURE SYSTEM AND METHOD OF CULTURING MARINE ANIMALS

This application claims priority from provisional application Ser. No. 60/005,723, filed Oct. 20, 1995 pursuant to 35 U.S.C. §119.

FIELD OF THE INVENTION

The present invention relates to a method and apparatus for mariculture. More particularly, the present invention relates to a method and apparatus for rearing or cultivating aquatic and marine animals such as crustaceans, fish, shells or the like in open air ponds.

BACKGROUND OF THE INVENTION

As the demand for food throughout the world increases, a great deal of effort has been expended finding ways to more efficiently produce food, both animal and vegetable, to satisfy the demand. Sea life, including crustaceans and fish, has long been a source of high quality protein for human consumption. However, the activities of the wild marine product industries have, in recent years, been severely restricted because of environmental contamination problems and overfishing. Fish catches have become much smaller and it has been difficult to keep fishing grounds productive. Attempts have been made to grow monocultures of aquatic animals (e.g., shrimp farming) under varying levels of controlled conditions. Often such farms provide a large proportion of a particular kind of seafood consumed. For example, approximately half of the pennaeid shrimp consumed in the United States in 1993-94 were from farms. Aquaculture systems of the prior art (or mariculture systems, for sea-born animals) are either open (i.e., water is constantly replenished from an outside source) or closed (i.e., the same water is recirculated through the system).

Successful mariculture has been undertaken mainly in coastal areas using estuarine or coastal waters which are rich in nutrients provided by effluents from the land. Efficient production of crustaceans, fish, and shells have been undertaken by surrounding part of a marine area such as a call gulf, a lake or an estuarine river having favorable conditions with nets, or by building ponds on land which take advantage of the tidal flow from the sea or the natural flow of water from rivers or estuaries. Large shrimp farms have thus been built in the coastal zones of Latin American and Southeast Asian countries. These shrimp culture systems rely partially on the eco-systems and marine food chains that develop in the rearing ponds to supply the feed for the shrimp. In certain cases natural foods produced in ponds are supplemented by shrimp feed or the natural food chains are stimulated by the addition of fertilizer.

A disadvantage of open mariculture systems, i.e., those systems which rely on natural water sources and which are constantly exposed to the environment, is that water quality in estuaries and near shore areas may vary greatly depending upon the nature of the effluents from the land. Herbicides, pesticides, and other agricultural effluents may thus find their way into mariculture systems in affected areas. Similarly, industrial or urban effluents may adversely affect the water quality for such mariculture systems in coastal areas.

An example of the deleterious effects of chemical effluents on the culture of marine life is Taura syndrome, which has afflicted the shrimp farming industry in certain tropical locations. The syndrome attacks juvenile shrimp (0.1 to 5 grams in weight) within 14 to 40 days of stocking into grow-out ponds. Afflicted juvenile shrimp stop feeding, become lethargic, and ultimately die. It appears that the syndrome is caused by high levels of agricultural chemicals in the shrimp culture water, especially fungicides, which are heavily used by agricultural concerns in the affected region. (Lightner, et al., *Diseases of Aquatic Organisms* 21:53-59, 1995; Wigglesworth, J., *Fish Farmer* 17:30-31, 1994). Chemical pollution by agricultural chemicals has also adversely affected shrimp harvests in Latin and South America and Southeast Asia.

In addition to mortality due to chemical contaminants, shrimp are susceptible to infection by a variety of viral and bacterial pathogens, such as parvoviruses, baculoviruses, Vibrio, and necrotizing hepatopancreatitis bacterium. Infection with these pathogens result in significantly reduced yields of shrimp. Thus, elimination of the etiological agents of Taura syndrome and infectious diseases of shrimp would be of great utility to the shrimp farming industry in particular, and to the mariculture industry in general (Lightner et al., *Int. Sym. on Aqu. Anita. Health*, Program and Abstracts, 1994, p. V-3).

In light of these problems, there have been attempts to practice mariculture in closed loop systems, by providing a culture environment in a tank installed on land. According to these methods, the problem of environmental contamination can be avoided by isolation of the culture system from natural water sources and by using recirculating culture water which is recycled through waste water purification mechanisms; using these methods, waste water levels are reduced as much as possible in order that the minimal amount of water will need to be replaced. Several such methods and arrangements for breeding aquatic life in closed systems have been described by the prior art (see U.S. Pat. Nos. 5,076,209 by Kobayashi, et al.; 4,052,960 by Birkbeck, et al.; 4,394,846 by Roels; and 3,973,519 by McCarty, et al.).

In theory, by using a closed loop system the problem of environmental contamination can be eliminated and a stable supply of fresh marine products can be provided without creating environmental problems. Mother supposed advantage of closed loop systems is that if water is to be heated or refrigerated, the expense involved in maintaining the temperature in a closed loop system could be considerably less than in an open system since once a volume of the water is brought to the desired temperature, little energy is required to maintain that temperature. It is claimed that the ability to strictly control the environment in a breeding tank would make it possible to vary the kinds of fish that can be cultured. Also, since water is continually reused, expenses for supplying, moving and storing water can be minimized.

Despite the advantages that closed-loop mariculture systems seem to provide over open systems, however, their potential utility remains just that—potential. While it has been proposed that rational cultivation of aquatic life in closed-loop systems can be obtained by imposing the efficiency of industrial processes to mariculture, large-scale operations have not yet been shown to be commercially viable.

Open systems are, to date, the only systems of sufficient magnitude to support commercially viable operations. The volumes of water that are necessary for economical mariculture operations can only be obtained from natural water sources, i.e., lakes, rivers, estuaries, and seas. However, the drawbacks of using natural water sources as enumerated by the closed-loop mariculture system prior art (including, for example, contamination with herbicides, fungicides and bacterial and viral pathogies) do exist and are a major problem for operators of a mariculture system. For example, in shrimp mariculture it is usual in affected areas that only 20% of seeded postlarval shrimp (seeded at a density of 150,000 per hectare) become mature, harvestable adults because of the deleterious effects of pollution and disease. The present inventors have worked to develop means to ameliorate the effects of pollution and disease on aquatic life in a mariculture system.

The use of ozone to purify recirculating water of nitrogenous and other organic wastes generated by the species being cultured in the system is known in closed-loop systems for mariculture (Kobayashi, et al., U.S. Pat. No. 5,076,209 and Birkbeck et al, U.S. Pat. No. 4,052,960). The prior art also teaches the use of ozone to remove contaminants from fresh water to be used for drinking water (Foster, et al., *Water Supply* 10:133-145, 1992; Reynolds, et at., *J. Ozone Science and Engineering* 11(4):339-382, 1989).

However, when sea water or dilute sea water is the culture medium, as in the mariculture system of the present invention, ozone reacts with bromine ions which exist in the sea water, creating oxidized byproducts, especially hypobromous acid, which are toxic to sea animals. These byproducts must be removed or destroyed before the water is allowed to contact the species being cultured.

Despite this disadvantage, compared with chlorine or other methods of decontamination, the sterilization and purification functions provided by treatment with ozone are still attractive. If the problem of residual hypobromous acid (in the case where sea water or brackish water are used for culture water) can be overcome, the practicability of a mariculture system which uses ozone to remove or destroy toxic compounds, especially agricultural compounds of the type used near shrimp farms, would be greatly increased. Residual hypobromous acid can be removed by the addition of a reducing agent, but this is not practical given the large volumes of water that are routinely required in open mariculture systems.

Kobayashi U.S. Pat. No. 4,052,960 teaches the removal of toxic byproducts of ozonation by treatment with activated charcoal. However, Kobayashi also teaches that 10 liters of activated carbon is necessary to remove ozonation byproducts from systems containing 300 liters of water. It is readily apparent that using this ratio of activated carbon to water is impractical in large open systems. One 10 hectare pond filled to 100 cm contains 100,000 cubic meters of water, or 100 million liters. According to Kobayashi, treating the water from a single pond would require 3,333,333 liters of activated carbon.

It has now been unexpectedly discovered that the contamination and evaporation problems of open mariculture systems can be overcome by employing an open mariculture system comprising a means for transferring water from an estuarine water source to a replenishment reservoir that is in fluid communication with an ozonizing device which treats the replenishment water with a high concentration of ozone. The ozone treated water from the replenishment reservoir is transported through an activated carbon device into a containment area where it is admixed with recirculating water from a plurality of open ponds. The admixed recirculating and replenishment water is pumped into a sedimentation device and thereafter exposed to a low concentration of ozone, sedimented, aerated to remove hypobromous acid and thereafter delivered to a reservoir canal for subsequent admission to one or more open ponds for rearing aquatic animals.

The aquaculture system of the present invention overcomes the problem of contamination with hypobromous acid in open mariculture systems that draw estuarine (salt) water and avoids the prior art requirement for large quantities of activated carbon.

The ratio of activated carbon to water volume in the system of the present invention is only 0.08 to 0.15 liter per 300 liters of water. This is in contrast to Kobayashi (U.S. Pat. No. 5,076,209) which requires the use of a large ratio of activated carbon to culture water (10 liters per 300 liters culture water) because the activated carbon is used to remove hypobromous acid, whereas in the present open mariculture system activated carbon is used only as a final polishing step for removal of contaminants.

It has also been unexpectedly discovered that two different concentrations of ozone, one at a relatively high concentration (of between 2 and 5 ppm) for contaminated replenishment water, and a second at a lower concentration (between 0.8 and 2 ppm) for recirculating water, can be employed to purify natural source water for use in culturing of marine animals. The use of ozone to purify salt-containing brackish water created the hypobromous acid problem described above. It has also been unexpectedly discovered that hypobromous acid levels in ozonated brackish water can be reduced to levels that are not toxic to marine life by aeration of the ozone-treated water.

The mariculture system of the present invention also overcomes and eliminates a further problem which can afflict aquatic culture systems which rely on the unimpeded flow of their water source, which is that the level of the water source can rise and fall, depending on tides and rainfall. For example, high tides in certain tropical regions can raise and lower water levels 4 meters twice a day, often flooding drainage canals in existing shrimp mariculture systems and making it impossible to harvest shrimp at a desired time, because at high tide water would flow into the grow-out ponds, instead of out of them. The system of the present invention allows independent control of the water levels at all points in the system, such as the recirculating canal of the present system, which allows harvesting to be done at any time.

Use of the mariculture system of the present invention can improve yields of adult shrimp in open mariculture systems in affected areas by 75 to 125% (i.e., between about 35 to about 45% of seeded postlarval shrimp will grow to harvestable adulthood as contrasted with prior art systems in which only about 20% grow to harvestable size), and can produce amounts of shrimp far in excess of potential yields from closed mariculture systems.

OBJECTS OF THE INVENTION

It is an object of the present invention to provide an open system comprising a plurality of open ponds in fluid communication with a means for replenishing the water in the ponds and a water purification system suitable for the culture of marine animals (mariculture).

Another object of the invention is to provide a mariculture system arranged such that only one pumping step will allow recirculating water to flow completely through the system by force of gravity.

Another object of the present invention to provide an apparatus for stabilizing loss of water from an open mariculture system due to evaporation and drainage into the soil.

A further object of the invention to provide methods of culturing marine animals in an open system using ozone as a means to purify the water of the system.

A still further object of the invention is to provide a mariculture system including means for reducing hypobromous acid levels produced by ozone treatment of brackish water to levels non-toxic to marine animals.

Another object of the present invention to provide an open-air mariculture system capable of rearing and harvesting aquatic animals in commercial quantities which is capable of removing or destroying toxic contaminants and pathogenic microbes from the replenishment and culture water of the system.

It is a further object of the invention to provide a method for preventing the occurrence of Taura syndrome in animals that are cultured in an open mariculture pond system.

It is a further object of the invention to provide an open-air mariculture system capable of culturing shrimp with a survival rate of 35 to 45 percent of seeded postlarval shrimp.

SUMMARY OF THE INVENTION

In accordance with the present invention, there is provided a mariculture system comprising a means for transferring water from an estuarine water source to a replenishment reservoir that is in fluid communication with an ozonizing device which treats the replenishment water with a high concentration of ozone. The ozone treated water from the replenishment reservoir is transported through an activated carbon device into a containment area where it is admixed with recirculating water from a plurality of open ponds. The admixed recirculating and replenishment water is pumped into a sedimentation device and thereafter exposed to a low concentration of ozone, sedimented, aerated to remove hypobromous acid and thereafter delivered to a reservoir canal for subsequent admission to one or more open ponds for rearing aquatic animals.

There is also provided a method of culturing aquatic life which comprises obtaining water from a natural water source which is contaminated with microorganisms or compounds harmful to the desired aquatic species, purifying the contaminated water using a first level of ozone, combining the purified replenishment water with recirculating culture water, further purifying the combined water with a second level of ozone, removing residual toxic byproducts of the ozonation by aeration, and replenishing the water in the culture system with the combined purified, aerated water.

Also provided are methods for feeding the aquatic life to be cultured in a mariculture system and for harvesting the aquatic life from a mariculture system without regard for the tides or levels of the natural water source which supplies the mariculture system.

All patent applications, patents, and literature references cited in this specification are hereby incorporated by reference in their entirety. In the case of inconsistencies, the present description, including definitions, will control.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 4A, 4B, 5, 6A, and 6B comprise a cross-sectional view of the mariculture system of the present invention when joined along lines C—C and D—D, illustrating the relative water levels in the various components that allow it to operate largely by gravity flow;

FIG. 7 is a schematic of the connection of the ozone generators to the replenishment and recirculating ozone contactors;

FIG. 8 is a horizontal cross section of the recirculating ozone contactor;

FIG. 9 is a cross sectional view taken along line 9—9 of FIG. 8, looking in the direction of the arrows, illustrating the layout of the ozone diffusors;

FIG. 12 is a cross sectional view taken along line 12—12 of FIG. 10, looking in the direction of the arrows.

DETAILED DESCRIPTION OF THE INVENTION

Figure 1A:
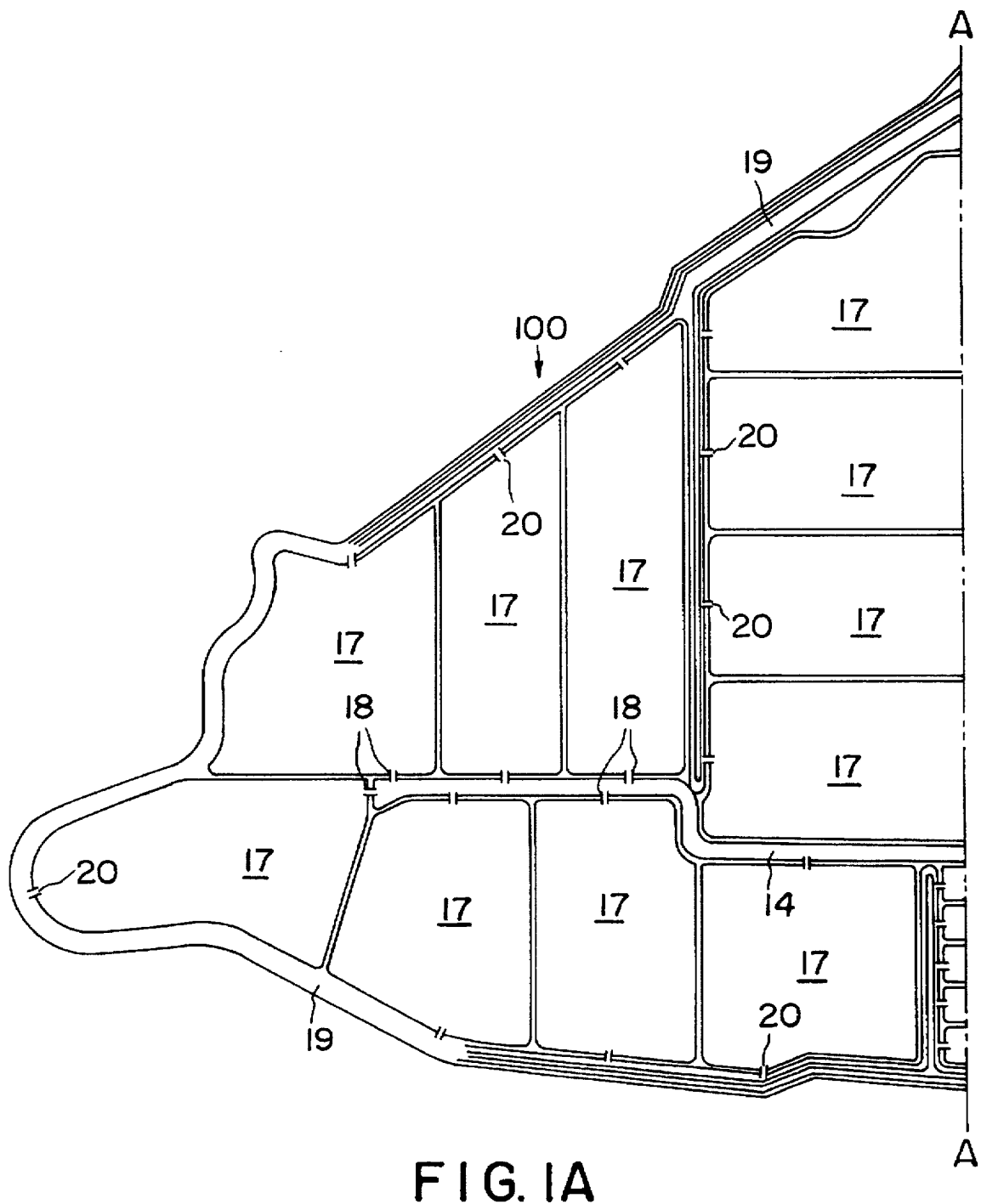
FIGS. 1A and 1B together comprise an aerial or top plan view of a representative mariculture system of the present invention when joined along match line A—A.
Figure 1B:
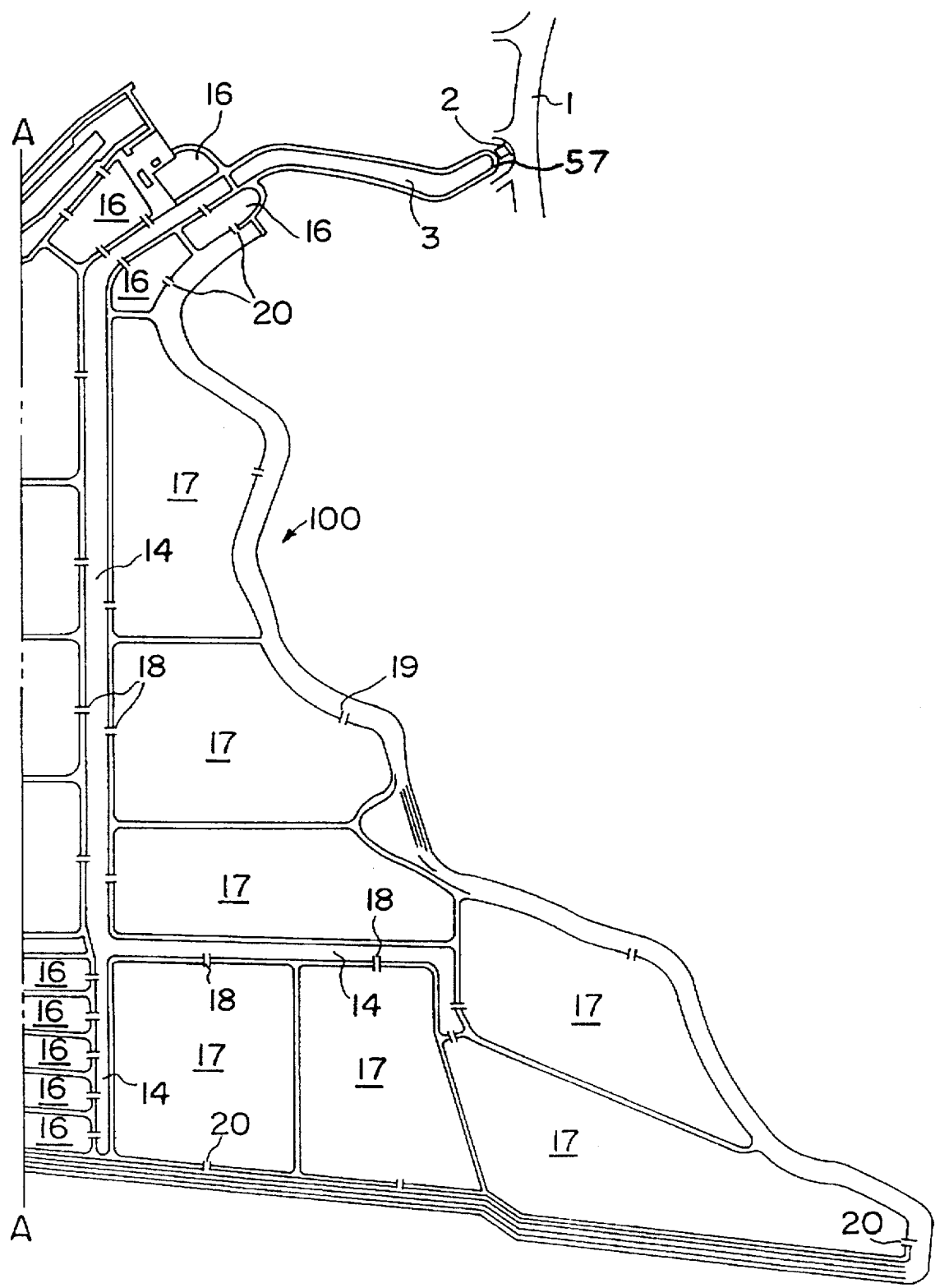

Referring to FIGS. 1A, 1B, 2A, 2B, and 3, a mariculture system 100 is illustrated. The mariculture system includes a natural water source 1, a pumping station 2, a replenishment reservoir 3, an ozone generation device 4, an ozone contacting device 5, an activated carbon device 6, a containment area 7 for mixing recirculating and replenishment water, a second pumping device 8, a sedimentation device 9, a second ozone contacting device 10, a second sedimentation device 11, an air blowing device 12, an aeration device 13, a reservoir canal 14, activated carbon filters 15 at the inlets of the ponds, warehousing ponds 16 and grow-out ponds 17. The connection and operation of these system elements is described below.

Inlet (flow control gates 18 are disposed at the entrance to a plurality of ponds 16, 17. A recirculating canal 19 is disposed on the outer perimeter of the ponds 16, 17. Inlet gates 18 permit the selective flow of fluid from the reservoir canal 14 to the ponds 16, 17. Outlet gates 20 permit the selective exit of fluid from the ponds 16, 17 to the recirculating canal 19.

FIGS. 4A, 4B, 5, 6 and 6A show the relative water levels 21 in the various components of the system. Because the water level 21 generally decreases in the downstream sections of the system, the water is forced to flow through the system largely by force of gravity. This avoids the use of electrical energy which would otherwise be devoted to pumping water through the system.

The ozone contacting devices 5, 10 are illustrated in FIGS. 4A, 5, and 8–12. The ozone contacting device 5 receives water from reservoir 3 through conduit 22.

An outlet gate 18 is disposed at the exit of reservoir 3 to conduit 22 to regulate the amount of water permitted into ozone contacting device 5. The ozone contacting device 5 (see FIGS. 4A and 10–12) includes a housing 24 that includes ozone diffusers 26 disposed adjacent to the bottom of the housing 24. Diffusers 26 produce a fine mist of ozone bubbles 28 which bubble up into the water. The bubble size is adjusted to ensure that substantially all of the ozone is absorbed into the water before the bubbles reach the surface. The ozone generators can be, for example, PCI ozone generators, made by PCI Co. (West Caldwell, N.J.) or Ozonia ozone generators, which are made by Ozonia International (Rueil-Maimaison, FRANCE). Ozonia generators are preferred. The ozone diffusers 26 receive ozone from the ozone generating device 4 (see FIG. 2A, 3, and 7) which in the present embodiment is comprised of two PCI ozone generators, models B72, which are capable of producing 72 pounds of ozone per day and model HT150, which is capable of producing 150 pounds of ozone per day. Ozone generators of greater or lesser capacity can be used in the mariculture system of the invention, depending on the scale of the system. The ozone diffusers 26 can be of any suitable type gas diffusers, such as Ozonia™ (from Ozonia International, as above) or Airamic™ (from Ferro Corp., East Rochester, N.Y.) diffusers. Ozonia™ diffusers are strongly preferred because of the durability that they display within the ozone contacting devices. Ozone contacting devices 5, 10 also include baffles 30 (see FIG. 8, 10, and 12) for the mixing of the water to ensure even distribution of the ozone. The amount of ozone that is required to cleanse the water varies with the season, the volume of water to be treated, and the flow rate of the water and can be readily determined by one skilled in the art.

Figure 3:
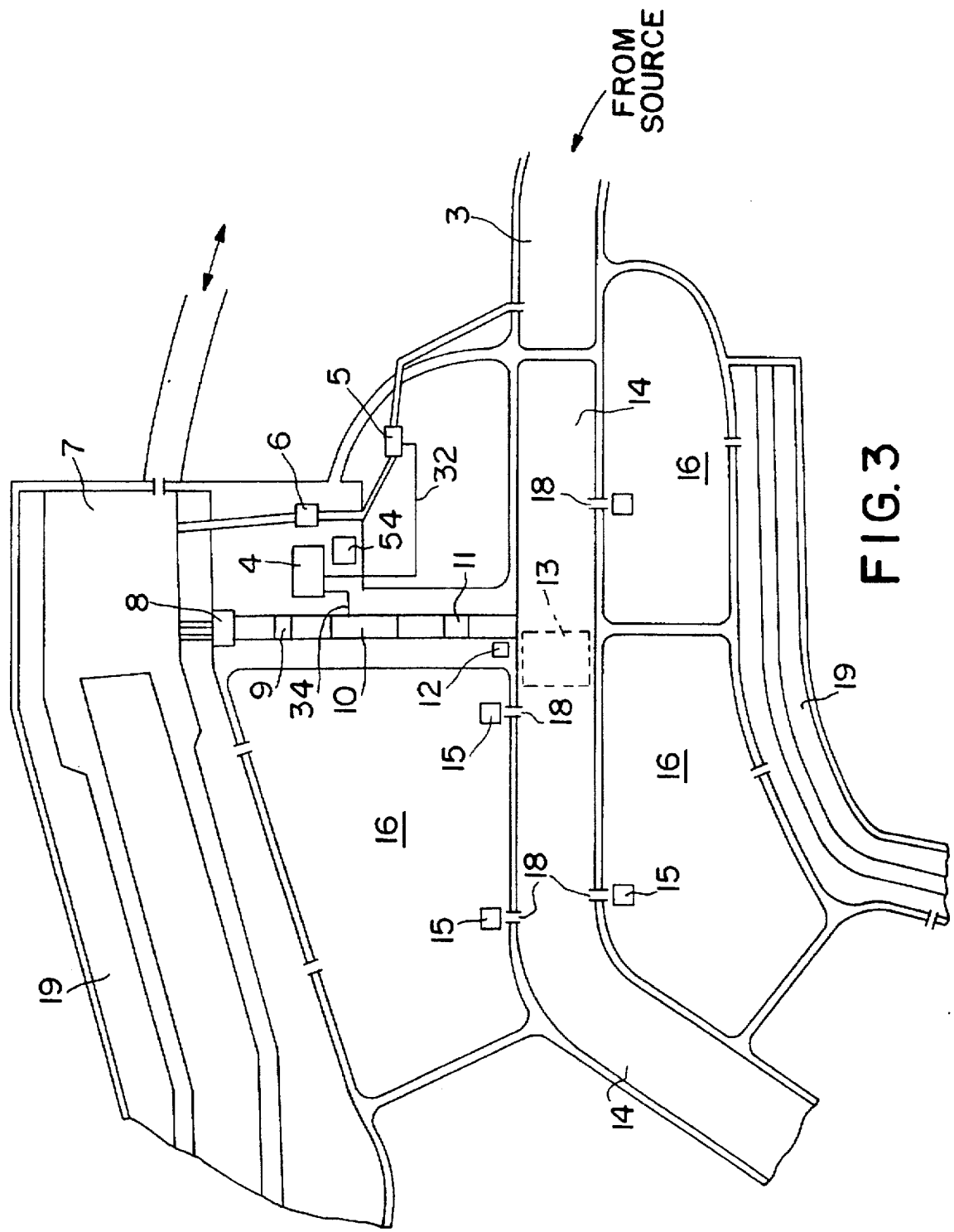
FIG. 3 is an enlarged aerial or top plan view of the water replenishment and treatment arrangement.
Figure 4A:
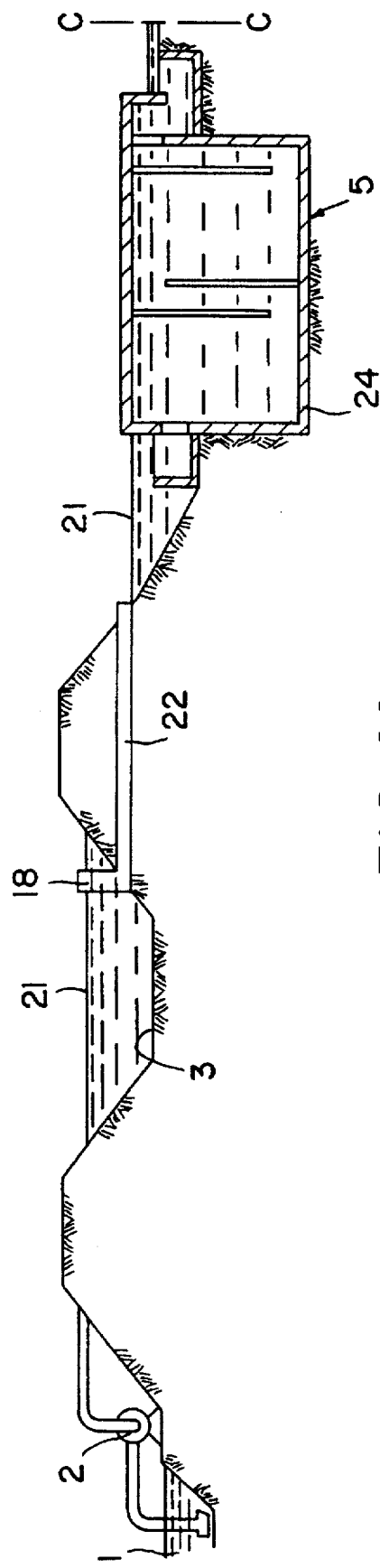

As illustrated in FIGS. 3 and 7, the ozone generator 4 is in fluid communication with the ozone contacting devices 5, 10 by conduits 32 and 34. A schematic of the ozone generator 4 and the ozone contacting devices 5, 10 is illustrated in FIG. 7. Ozone contacting device 5 is further illustrated in FIGS. 10 and 12. The Ozone contacting device 5 includes a venting apparatus 36 disposed at the top of the housing. Venting apparatus 36 can be used to ventilate any accumulated air or ozone at the top of the ozone contacting device 5. Referring now to FIGS. 8 and 9, the second ozone contacting device 10 is illustrated. As illustrated in FIGS. 8 and 9, the second ozone contacting device utilizes a similar arrangement whereby diffusers 26 are disposed adjacent to the bottom of the housing 35. As discussed above, the purpose of the diffusers 26 is to produce a free mist of ozone bubbles within the water, such that as the ozone bubbles float towards the surface of the water, they are substantially completely dissolved and absorbed into the water. The absorption of ozone in the water helps cleanse the water of impurities such as agrochemicals.

Referring now to FIG. 4B, the activated carbon device 6 is illustrated. In the preferred embodiment of the present invention, the activated carbon device 6 includes fourteen modules 40 of activated carbon, each being 4 cubic meters in volume and holding about 4,400 pounds of activated carbon. Preferably, the activated carbon is prepared using African Palm Kernel shells. As illustrated in FIG. 4B, the modules 40 are arranged in two rows, with each row containing seven modules.

Figure 5:
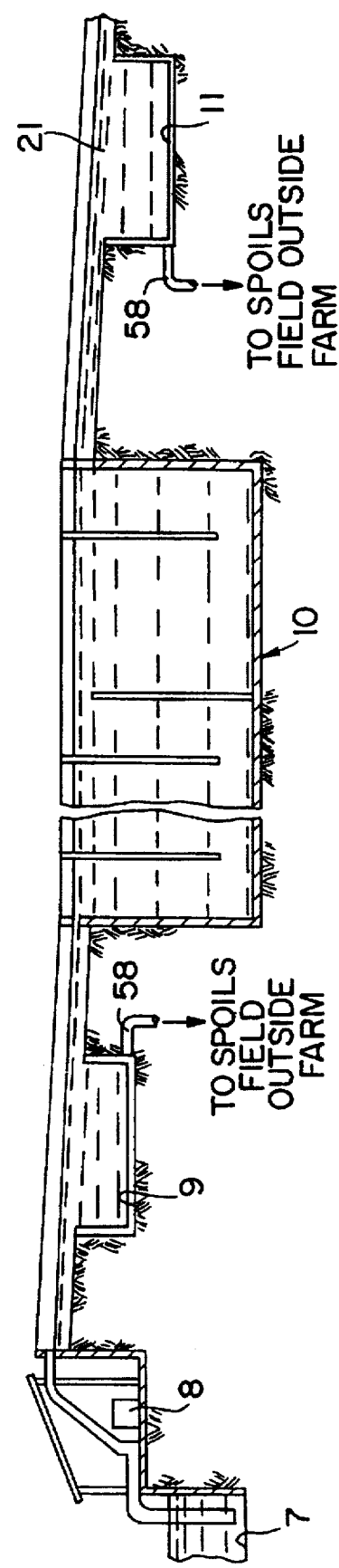
Figure 10:
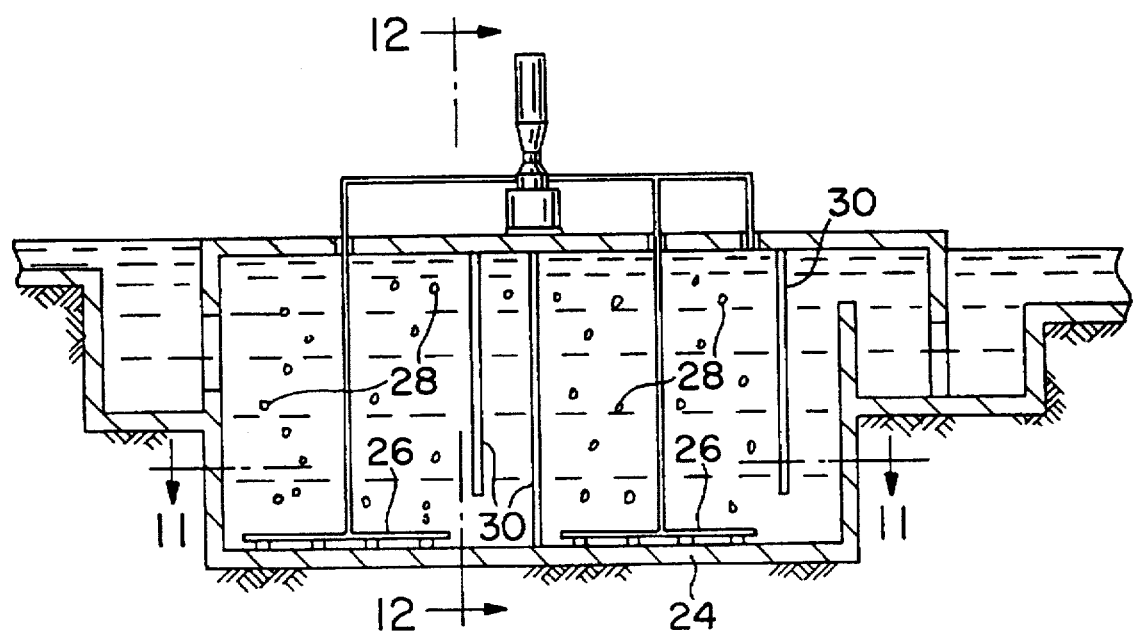
FIG. 10 is a horizontal cross section of the replenishment ozone contactor.
Figure 11:
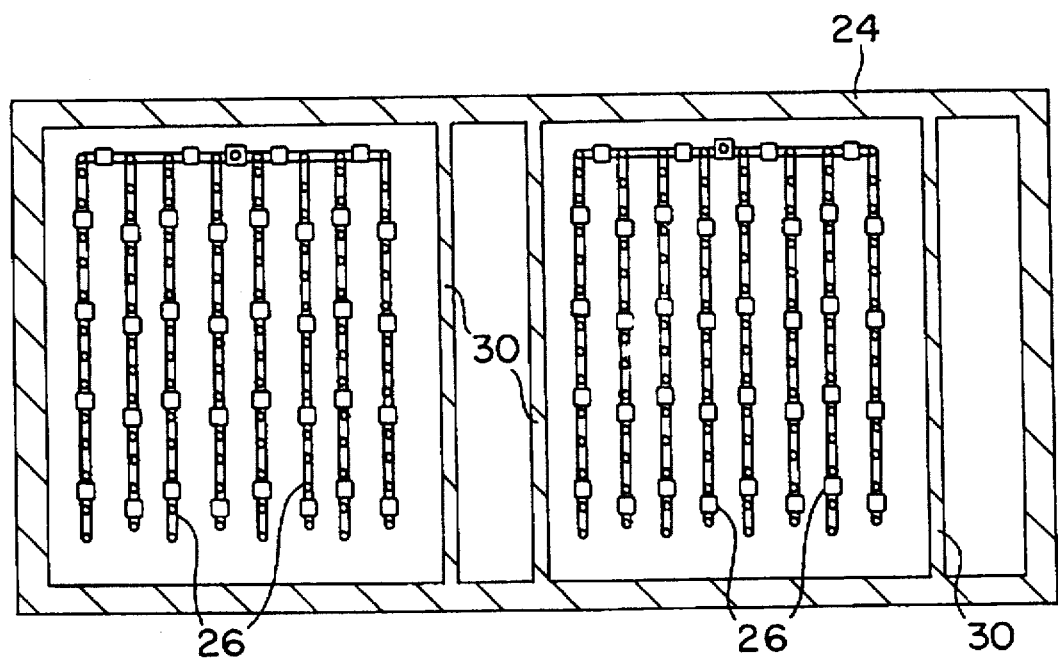
FIG. 11 is a cross sectional view taken along line 11—11 of FIG. 10, looking in the direction of the arrows, illustrating the layout of the ozone diffusors.
Figure 13:
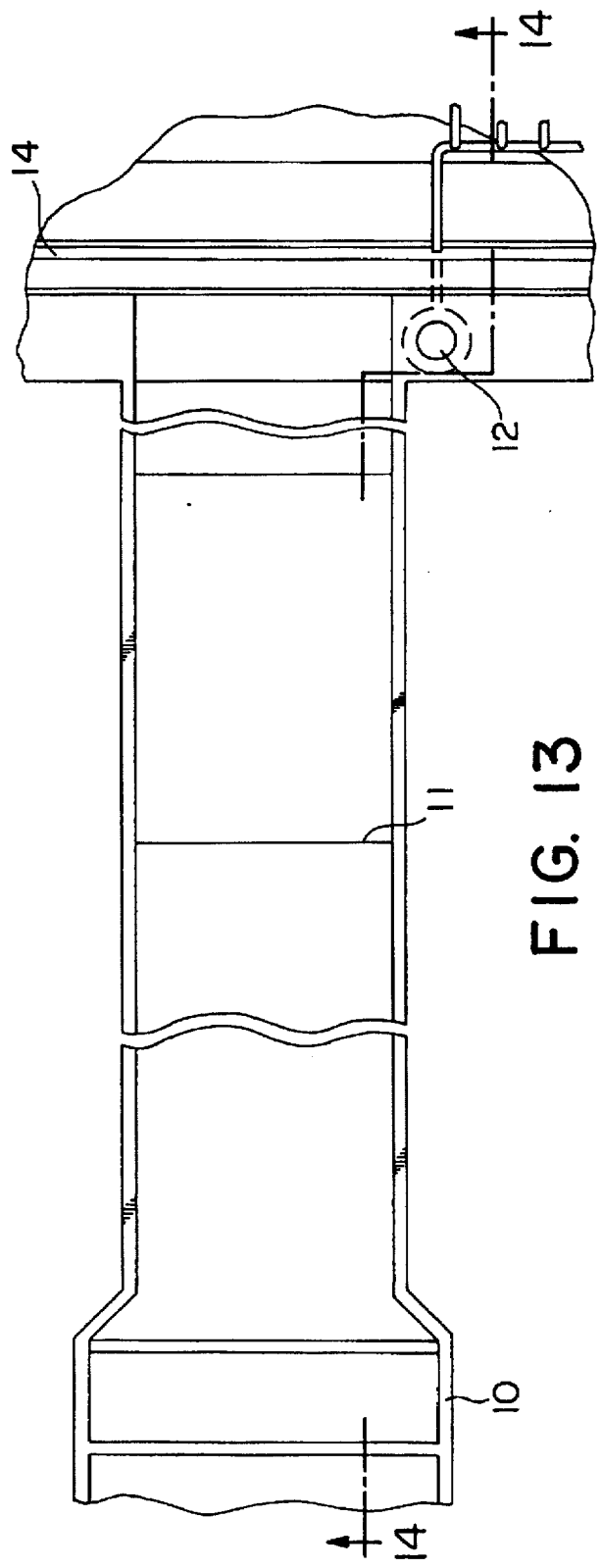
FIG. 13 is an aerial or top plan view of the second solid sedimentation device.
Figure 14:
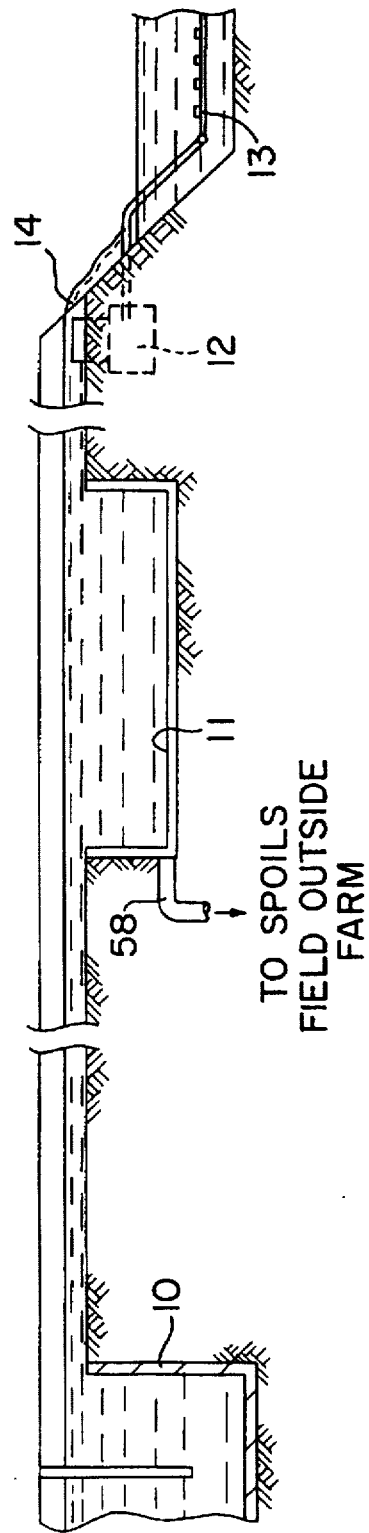
FIG. 14 is a cross sectional view taken along line 14—14 of FIG. 13, looking in the direction of the arrows.

Referring now to FIG. 5, the first sedimentation device 9 is a reinforced concrete chamber. In a preferred embodiment the chamber is 8 meters wide by 8 meters long by 2 meters deep. The retention chamber 9 is sized to permit particulate solids to settle in the bottom of the chamber 9 while permitting the liquid to continue to flow on to the next station. Thus, it is readily apparent that the size of the sediment device will vary depending upon the size of the mariculture system. The second solid sedimentation device 11 receives fluid from the second ozone contacting device 10. Once again, the second solid sedimentation device 11 is preferably a reinforced concrete chamber that in a preferred embodiment, is 6 meters wide by 8 meters long by 2 meters deep. FIGS. 13 and 14 show a plan and sectional view respectively of the second sedimentation basin 11.

Figure 15:
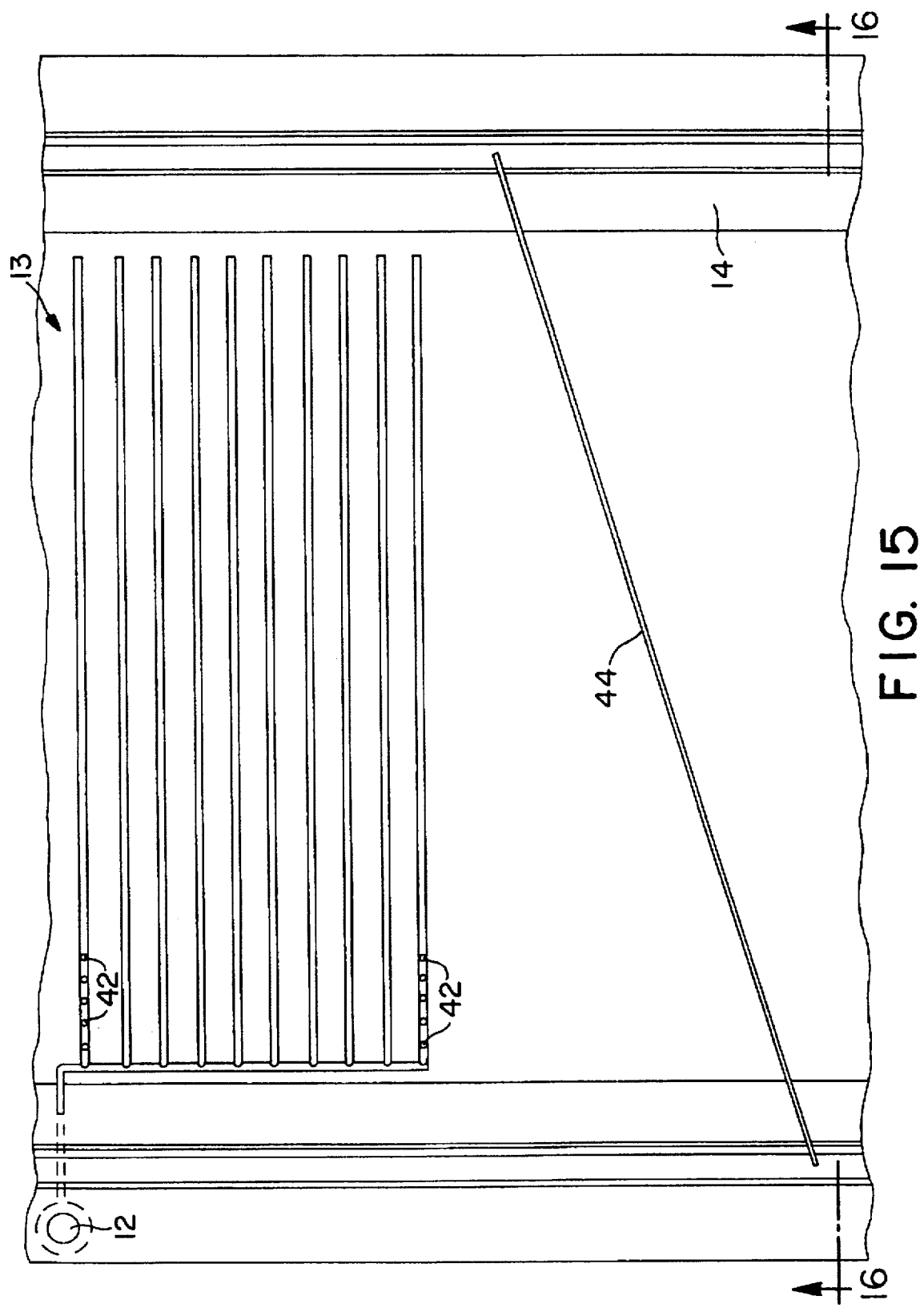
FIG. 15 is an aerial or top plan view of the aeration device.
Figure 16:
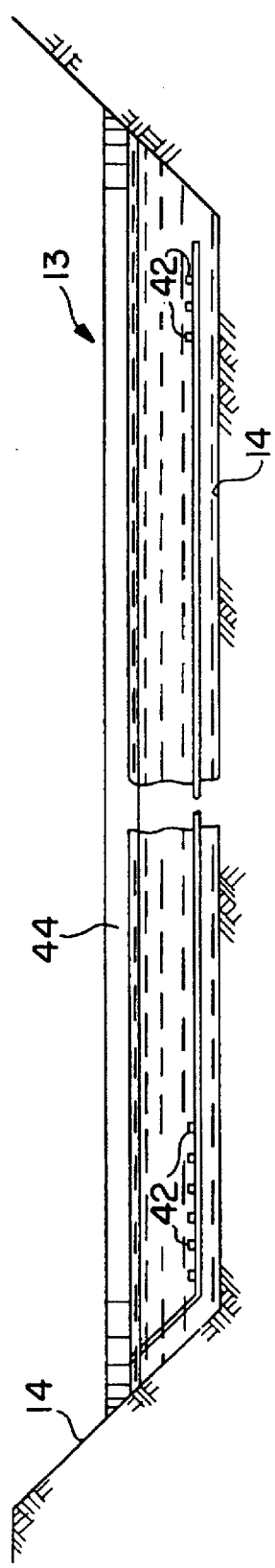
FIG. 16 is a cross sectional view taken along line 16—16 of FIG. 15, looking in the direction of the arrows.

Referring now to FIGS. 3 and 13 through 16, the aeration device 13 and air blower 12 are illustrated. In a preferred embodiment, the air blowers 12 are roots rotary blowers. Each blower has the capacity to pump 300 cubic feet of air per minute at 15 pounds per square inch. Air is diffused to the aeration device 13 through Sweetwater™ diffusers 42, available from Aquatic Ecosystems, Inc. of Apopka, Fla. During aeration, organic material and other foreign matter is captured in the air bubbles and floats with the bubbles to the surface of the water, where it creates a foam. The bubbles produced by stone 42 are preferably sized not to be completely absorbed by the liquid, but are to reach the surface. A curtain 44 is disposed so that it depends downwardly over the aeration device 13 and depends downwardly into the water surface for at least one meter or more. The curtain 44 is made of a porous material, preferably burlap, and is stretched across the aeration device over the entire flow path of the water. Thus, porous curtain 44, catches the foam (containing the impurities) which is floating at the surface of the water in the aeration device. The foam can then be periodically easily skimmed from in front of or upstream of the curtain in any suitable manner. Thus, curtain 44 acts as a skimming device to remove the foam from the top of the water. Therefore, it follows that the curtain 44 is disposed a predetermined distance downstream from the air stones 42 to permit curtain 44 to catch all of the foam created by the aeration device, as illustrated in FIG. 15.

Figure 17:
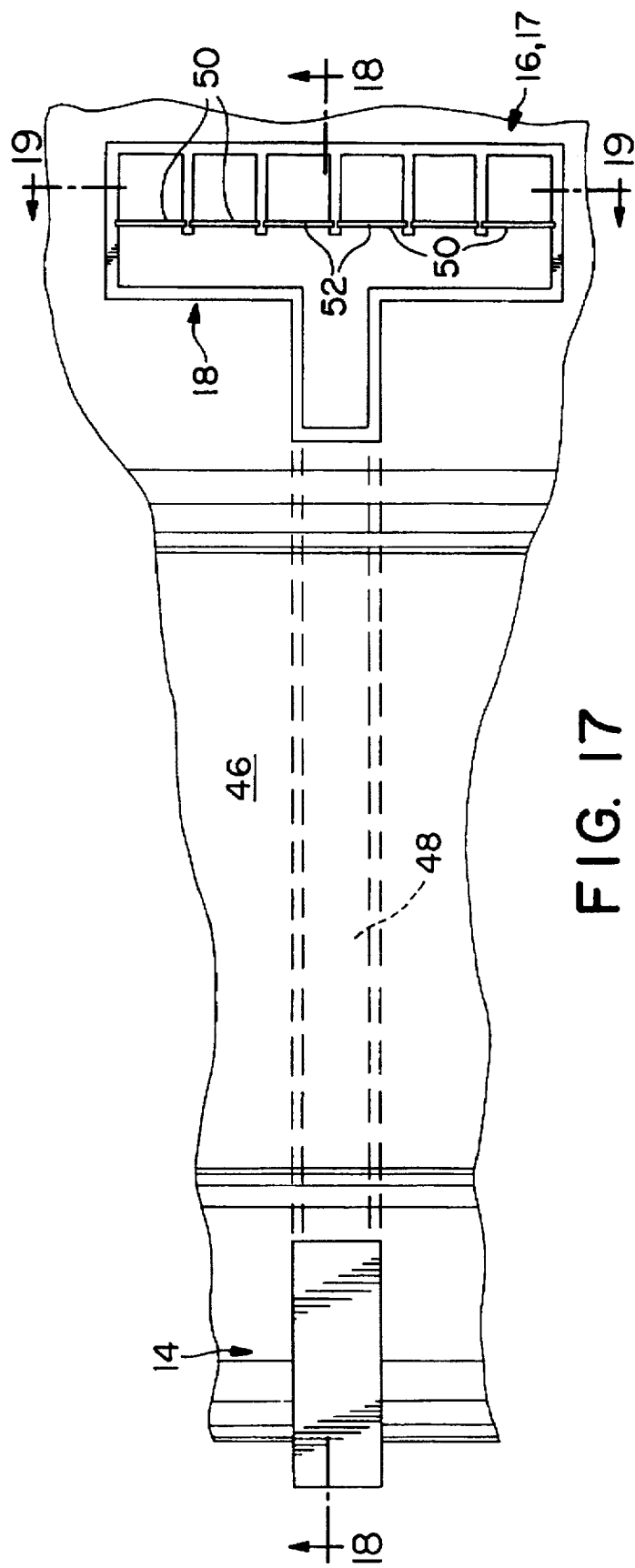
FIG. 17 is an aerial or top plan view of the gating mechanism and activated carbon at the entrance to the ponds.
Figure 18:
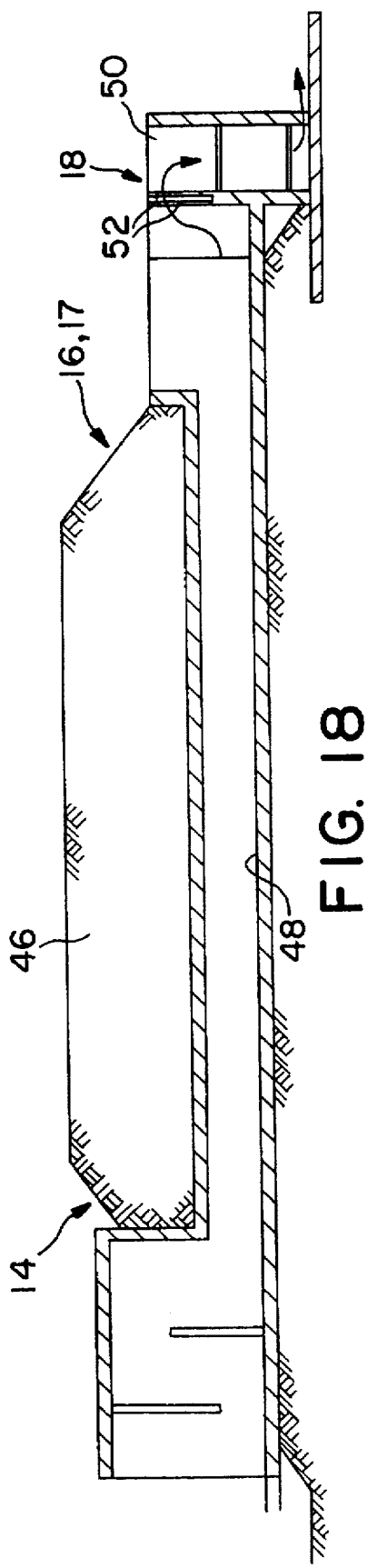
FIG. 18 is a cross sectional view taken along line 18—18 of FIG. 17, looking in the direction of the arrows.
Figure 19:
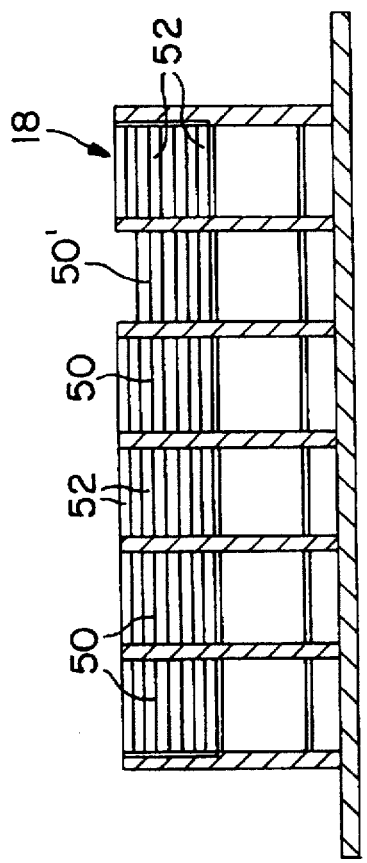
FIG. 19 is a drawing of the activated carbon filters and gating mechanism at the entrances of the ponds.

As illustrated in FIGS. 1A, 1B, 3, and 17 through 19, gates 18 are provided to regulate the flow from one chamber to another. The gates can be of any suitable valve construction to regulate the flow from the upstream chamber to the downstream. A preferred embodiment of the gates is illustrated in FIGS. 17–19 where the fluid flows for example, from the reservoir canal 14 to a grow out pond 17. Because of the rather voluminous size of the mariculture system of the present invention, dikes 46 are used to separate the canals from the ponds and to separate the various ponds 16,17 from each other. Accordingly, the fluid that flows from the reservoir canal 14 to a pond 16,17 flows through a conduit 48 burrowed through the dike as illustrated in FIG. 18. Each gate 18 is comprised of a plurality of individual gates 50 as shown in FIG. 19. At the top of gate 50 are disposed boards, such as, for example, "two by four" (i.e. 2"×4") wooden board 52. To regulate the height of the fluid, the boards can be removed from the gate 50 at any level, i.e., from the top, middle, or bottom of the gate. For example, the gate 50', which is illustrated in FIG. 19, is shown with the top two boards removed. Thus, the effective water level 21 would be reduced by the height of two boards. This arrangement allows for water at different levels of the pond to be selectively removed. For example, when it rains, fresh water is added to the ponds, and can affect the salinity of the ponds. However, fresh water is less dense than brackish water, and so fresh water added by rainfall will float on top of the ponds. If this water is removed quickly, before the salt in the water below diffuses up into it, the overall salinity of the pond can be maintained. Removal of the top boards of a gate can effectuate this selective removal of undesirable fresh water. Of course, other systems can be used to regulate the flow of fluid from between one chamber to another.

Figure 2A:
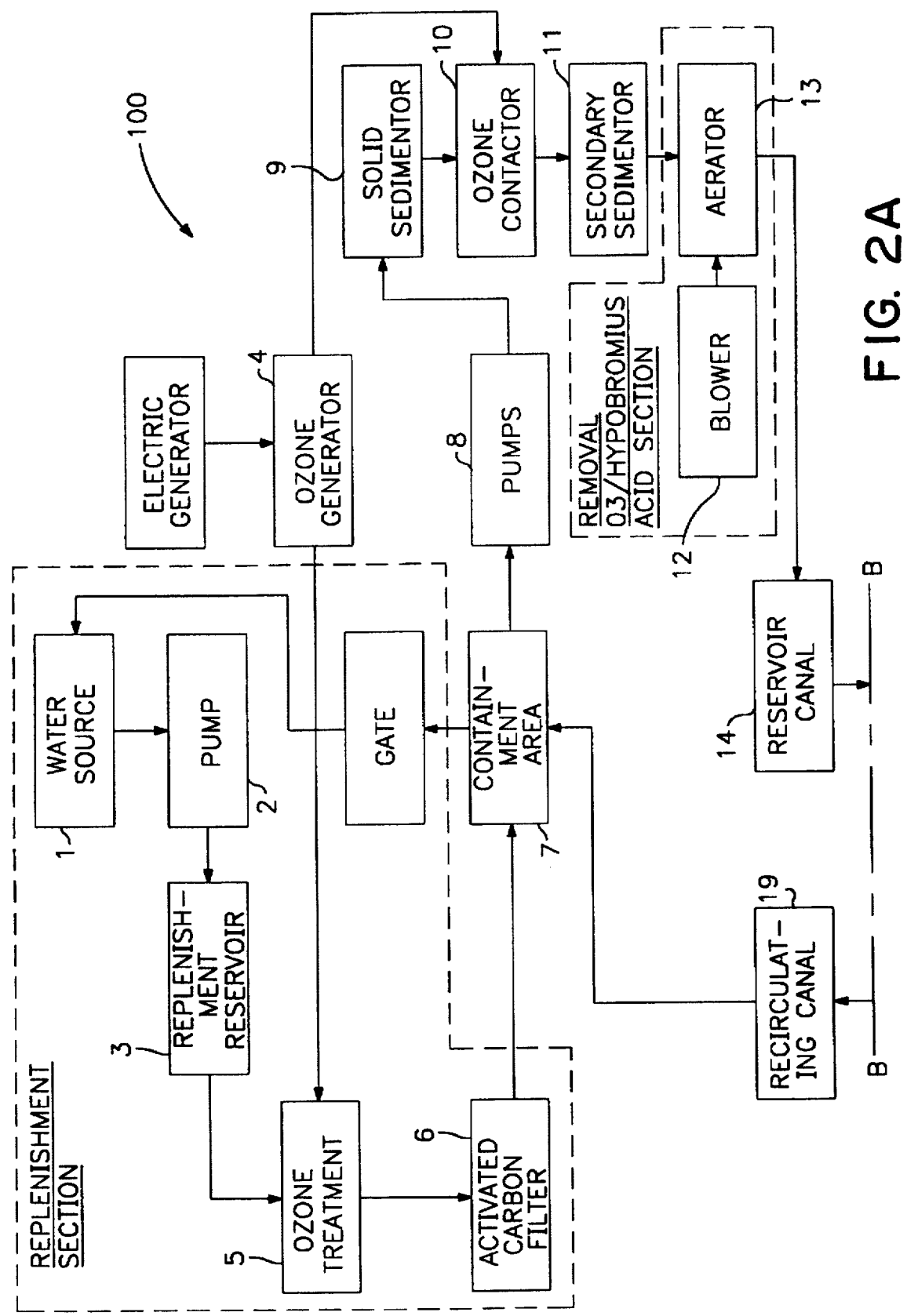
FIG. 2A and 2B together comprise a flow diagram indicating the path of water through the system when joined along match line B—B.
Figure 2B:
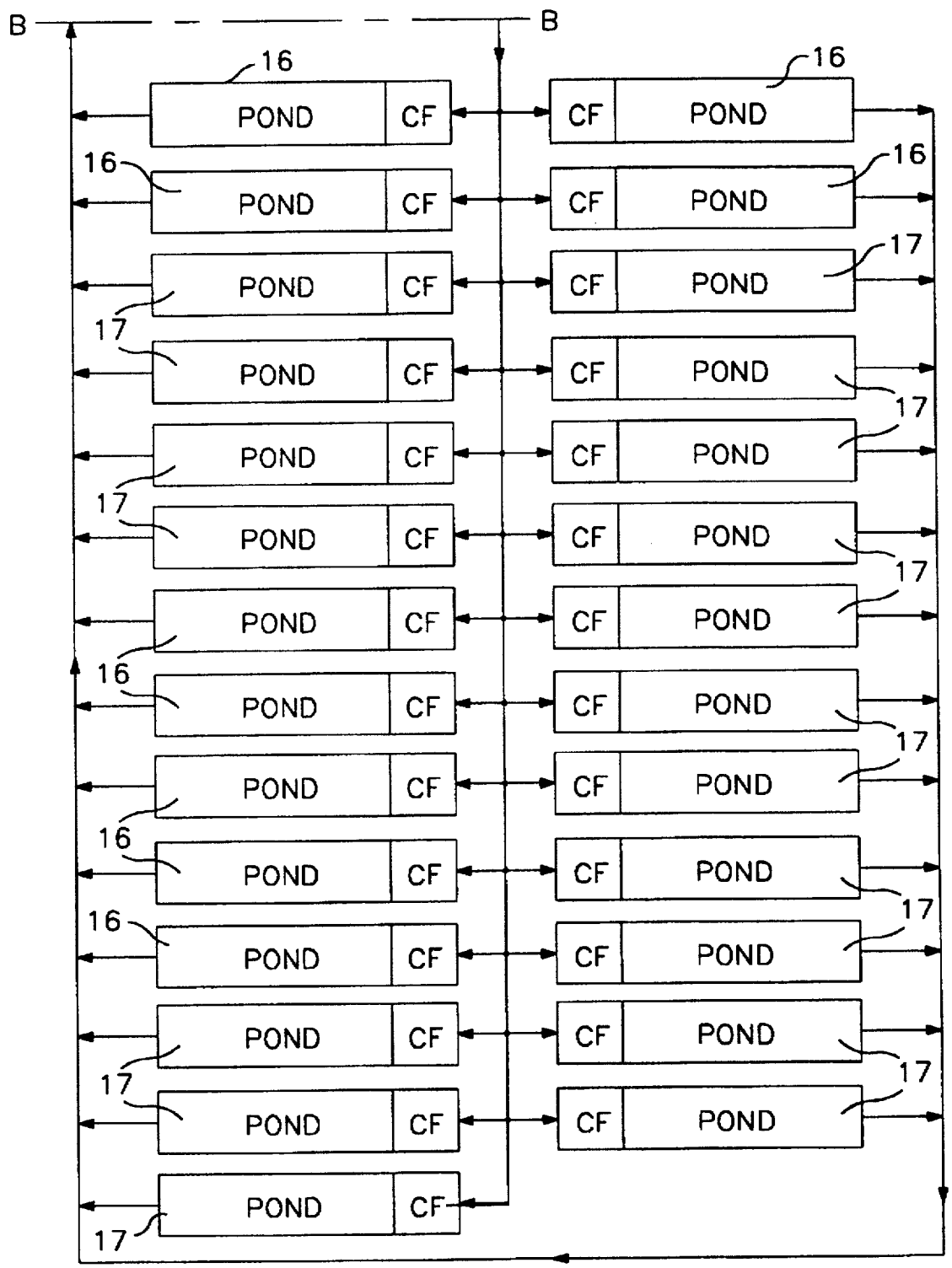

The operation of the mariculture system shown in FIGS. 1 through 19 is described below. The flow of water through the mariculture system is illustrated in FIG. 2A and 2B. The mariculture system is preferably located near a natural water source 1. In many instances, and for shrimp farming in particular, the water source is brackish water that has a significant saline content. The water source is frequently contaminated by industrial and agricultural chemicals or by natural pathogens which attack the cultivated species, or by both chemicals and pathogens. When raising shrimp, the water source should have a salinity of between 16 and 34 parts per thousand (ppt). The preferred level of salinity is between 22 and 34 ppt. A particularly preferred salinity level in the system is 28 ppt. The technique for measurement of the saline content of water is well-known in the art.

The system 100 can initially be filled by allowing untreated water from the natural (estuarine) water source to flow into the various components of the system via the reservoir canal 14. The system is then closed, e.g. by construction of earthen dike 57, to prevent the unimpeded flow of estuarine water into the system. Culture of shrimp and circulation of water through the purification devices 5, 6, 7, 9, 10, 11, 12, and 13 of the system can be commenced simultaneously in this embodiment. In another, preferred embodiment, the system is filled only with water that has been subjected to purification. Untreated water is pumped into the initially empty system, by pump 2, from the water source 1, filling the replenishment reservoir 3, and from there flowing through ozone contactor 5, activated carbon device 6, and then into containment area 7. Water is pumped from containment area 7 by pumping device 8 into sedimentation device 9, from which it flows into second ozone contacting device 10, sedimentation device 11, and aeration device 13 and then into reservoir canal 14. The canal 14 is filled with treated water and the treated water is then allowed to flow through gates 18 to fill the ponds 16,17.

Water is held in the replenishment reservoir 3 until needed in warehousing and grow-out ponds 16,17. Replenishment water is needed because, in the open-air system of the present invention, water is constantly being lost by evaporation and drainage into the soil. Water loss will vary from season to season and from geographical area to geographical area. However, in tropical areas the water loss from evaporation and drainage can be substantial. In order to keep water loss to a manageable level, the composition of the soil in which the mariculture system of the invention is constructed should preferably contain more than 50% clay, and preferably greater than 80% clay. The more clay there is in the soil, the less water loss there is due to leaching. In a mariculture system of about 200 hectares located in a tropical region, approximately 2 million gallons of replenishment water per day is required in the period from June to December, because evaporation is decreased due to humidity, while about 3 million gallons of replenishment water is needed daily during the period from January to May in order to replace water lost by evaporation. The mount of water required for replenishment will vary, of course, depending on rainfall and humidity, which can affect evaporation rates. The water in the system is typically completely replenished (i.e., entirely replaced with replenishment water) over a period of 10 to 11 months. Of course, the amount of replenishment water required per day, will also vary depending upon the overall size of the system.

The composition of the soil in which the pond system is constructed should be of such that during operation it will not create sediment levels that exceed 40% of the total volume of the water. Additionally, the sediment from the soil cannot be smaller than 20 microns, otherwise sedimentation will not be effective and the system will not function correctly.

When replenishment of water is needed in either the grow-out ponds 17 or the warehouse ponds 16, water is allowed to flow from the replenishment reservoir 3 to the first ozone contacting device 5 by opening gate 18 of replenishment reservoir 3. Replenishment water is preferably exposed to contact with a predetermined concentration of ozone for between about 30 seconds and about 5 minutes. Ozone is preferably added to the replenishment water at a relatively high concentration of between about 2 and about 5 parts per million, preferably between about 3 and about 4 parts per million. The amount of ozone that is added to the replenishment water varies with the season, the amount of water, and the flow rate of the water. Thus, higher levels of ozone are required in the winter, when evaporation loss is lower.

After ozone treatment, the replenishment water flows from the ozone reacting device 5 through the activated carbon device 6. After passage through the activated carbon device, the replenishment water flows to containment area 7, where the ozone-treated replenishment water mixes with water in the recirculating canal 19. In one preferred embodiment of the invention containment area 7 has an area of approximately 5 hectares. Containment area 7 also functions as an additional sedimentation area. Water is typically retained in the containment/sedimentation area 7 for between about 20 minutes to about 90 minutes to allow for sedimentation of particulate materials. The sedimentation devices and reservoir areas of the invention are cleaned regularly to remove sedimented solids. Specifically, replenishment reservoir 3 is cleaned once yearly by dredging; containment area 7 is cleaned once every six months by dredging; reservoir canal 14 is cleaned once yearly by dredging; and solids sedimentors 9 and 11 are cleaned weekly by draining the contents through a drain pipe 58 into a spoils area outside of the system.

The mixed replenishment and recirculating water is then transferred by pumping device 8 into the first solids sedimentor 9. The retention time in the first solids sedimentor is preferably about 20 seconds to 80 seconds, depending on the water flow rate.

Water flows by gravity flow from the first solids sedimentor 9 to the second ozone treatment device 10. In this second ozone treatment step ozone is added to a concentration of between about 0.8 and 2.0 parts per million (ppm) and preferably 1.6 ppm. The water is preferably allowed to contact the ozone for about 50 seconds to about 210 seconds, again depending on the water flow rate. The lower the flow rate, the greater the amount of time the water is allowed to contact the ozone. Any ozone generator capable of meeting the ozone demand of the system is suitable.

The ozone-treated water is then gravity fed into a second solids sedimentor 11. After allowing sediment to settle in chamber 11 for between about 15 seconds and 1 minute, the sediment free water is gravity fed to the aeration device 13.

During aeration of the ozonated water, toxic hypobromous acid, which is created when bromine-containing water is exposed to ozone, is destroyed to the extent that it is no longer at levels toxic to marine animals. Ozone-treated water is contacted with air bubbles introduced into the aeration device at 600 cubic feet per minute for between about 8 and 25 minutes. The air contact period is dependent upon the quantity of ozone that was added to the water, the mount of ozone that was consumed during the destruction of toxins and microorganisms, and the water flow rate. Longer contact times are preferred for water that has been exposed to larger quantities of ozone. During the aeration treatment, organic material and other impurities suspended in the water to be treated are captured in the air bubbles and float to the surface of the water where they create a foam or scummy residue. Curtain 44 catches the impurities-containing foam floating at the surface of water in the aeration device; the foam is then periodically skimmed from the curtain. The aeration step lowers hypobromous acid concentrations to levels that are non-toxic for marine life.

Following aeration treatment, the water is now suitable for culturing marine life such as shrimp, catfish, trout, etc. The aeration-treated water then flows, by gravity, from the aeration device 13 into reservoir canal 14. The quality of the water after aeration is constantly monitored using a bioassay system 54. This system 54 comprises of 10 closed tanks containing shrimp. The shrimp in these tanks are exposed to water exiting from the aeration device. The health of the shrimp is monitored for adverse effects, which would indicate either an excess of toxins or hypobromous acid in the water. Since the ozone-treated water passes into the reservoir canal before entering the ponds, any problems can be rectified before any contaminated water reaches grow-out ponds 17 or warehouse ponds 16. The reduction in the levels of contaminants, for example the herbicides atrazine and ametryn, that can be achieved by ozone treatment followed by activated carbon treatment of recirculating water is illustrated in Table 1.

TABLE 1

| HERBICIDE | ATRAZINE | AMETRYN |
|---|---|---|
| PRE-OZONE TREATMENT (ppt) (Estuarine water) | 5.7 | 4.2 |
| POST-OZONE TREATMENT (ppt) (water samples from reservoir canal) | 0.9 | 0.6 |
| POST-CARBON (in ponds) | not detectable | not detectable |

The data illustrate the utility of ozone in reducing the levels of contaminants in water. Measurements of contaminant concentrations were made using gas chromatography/mass spectrometry methods, which are well-known to those of ordinary skill in the art. The limits of detection for atrazine and ametryn are 0.5 parts per thousand, using gas chromatography/mass spectroscopy.

Water is stored in the reservoir canal 14, and flows by gravity through the gates 18, through activated carbon filters 15 at the entrance of the ponds, and then into the ponds 16, 17. Each approximately 10 hectare pond 17 has at its entrance six activated carbon filter modules 56 (See FIGS. 3 and 17), each containing 1 cubic meter of activated carbon. The warehouse ponds, being smaller, have an activated carbon filter comprised of one activated carbon module 56 containing 1 cubic meter of activated carbon. The carbon is removed from the modules and steam-cleaned weekly. The activated carbon in each filter module is completely replaced annually. In particularly heavy rainfall conditions (e.g., rainy season in tropical locations), it has been found to be advantageous to have the carbon reactivated. This is done by removing the carbon from the modules and drying the carbon at from ambient temperature to about 100° C. The carbon is then reactivated through removal of adsorbed substances. The reactivation is accomplished by heating the carbon granules to between about 100° and about 250° C., char formation by heating the carbon granules to between about 200° and about 750° C., and char gasification by heating the carbon granules to between about 800° and 1000° C. in the presence of limiting amounts of oxidizing gases such as flue gas, water vapor, or oxygen.

The ponds are of two types: smaller warehouse ponds 16, usually about 1 hectare or less, which can be used either to warehouse postlarval seedlings (i.e., shrimp weighing less than 1 g) or to grow out shrimp to their full size, and larger grow-out ponds 17, usually 10 hectares or larger in area, in which are the shrimp are permitted to grow to their ultimate size (i.e., preferably 15 to 18 g).

In shrimp mariculture, the temperature of the pond water should be maintained above 18° C. It has been found that shrimp stop growing when they are held at lower temperatures. The dissolved oxygen level in the pond water should be kept between about 2 and about 10 ppm and preferably between about 4 and about 5 ppm. When the dissolved oxygen content in the pond water falls below 2 ppm the shrimp are adversely affected. In the practice of the present invention, dissolved oxygen levels should be monitored and kept at or above 2 ppm. Dissolved oxygen levels tend to be at their lowest between about 5 and 6 AM because no photosynthesis of the phytoplankton in the water has occurred during the night and thus dissolved oxygen measurements are preferably made in the early morning.

Optionally, the culture ponds can be inoculated with garlic paste, which can be prepared by mashing fresh garlic. In the mariculture system of the present invention, this garlic paste acts as a bacteriostat, which reduces the organic matter load which is produced by the culture of marine life in the ponds. The reduction in organic matter load in the recirculating water significantly reduces the fuel consumption of the system, as the (second) level of ozone which must be attained in the combined recirculating and replenishment water is significantly lower than that required when garlic paste is not added to the pond water. Since generation of ozone requires significant expenditures of energy, reduction of the amount required produces significant cost savings.

Garlic paste is added to the rearing ponds in the following manner. During the first and second weeks after the time at which the marine life to be cultured introduced into the rearing ponds, about 1 kilogram of garlic paste per hectare of pond is added. During the third week, 500 grams of garlic paste are added per hectare every other day. From the fourth week until harvest, for each estimated thousand pounds of live shrimp in a rearing pond, about 500 grams of garlic paste is added on either a daily basis or every other day, depending on the condition of the rearing pond, i.e., if the animals in a pond do not seem to be growing as quickly as expected or desired, garlic paste can be applied on a daily basis, whereas if the animals are growing and surviving well, garlic paste addition can take place on an every other day basis.

Between about 3 and 8% by volume of the water in the grow-out ponds is exchanged daily. That is, every day 3 to 8% of the total volume of water in a given pond is allowed to enter from the reservoir canal 14, and a similar amount is allowed to empty from the pond into the recirculating canal 19. This circulation allows constant reconditioning of the culture water in the pond by sedimentation, ozone, and aeration treatments for further use in the mariculture system. With the mariculture system of the present invention between about 25 million and about 70 million gallons of water (total from all ponds) can be recirculated daily. In a preferred embodiment about 30 million gallons of ponds water is recirculated daily. Of course, this number will vary depending upon the size of the system.

The minimum viable size of a farm for culturing shrimp using the mariculture system in the present invention is 30 hectares and the maximum size is about 800 hectares. A preferred embodiment of the system (see FIG. 1) is approximately 200 hectares. The preferred maximum area of an individual grow-out pond 17 is about 25 hectares. There is no minimum size for a pond. In the present embodiment, ponds are graded in the soil and have no artificial lining or water barrier. However, any suitable lining material, such as plastic or concrete, may be used in the ponds in the practice of the invention.

Culture of Marine Animals

The use of the present invention for the culture of shrimp will be described. Shrimp are bred in tanks using methods well known in the art. It takes approximately 17 to 19 days for a shrimp to grow from an egg to postlarval stage (i.e., about 0.0001 gram). Postlarval shrimp are transferred to small warehouse pond 16, where they are warehoused. Shrimp from the warehouse ponds 16 are collected when they have grown to between about 0.5 to 1 gram and transferred or seeded into the grow-out ponds 17 at a density of from about 150,000 to 180,000 (*Pennaeus vannamei* or *monodon*) or 90,000 to 120,000 (*Pennaeus stylirostries*) postlarval shrimp per hectare of pond.

The shrimp subsist primarily on phytoplankton that is introduced into the ponds. For a 10 hectare pond, the initial seeding mount of phytoplankton is about 3300 pounds. For a 1 acre warehouse pond, the initial seeding amount of phytoplankton is about 330 pounds. Phytoplankton is grown in tanks by methods well-known in the art, and can be collected from the tanks by well-known methods, such as by centrifugation of phytoplankton containing culture medium, or by microfiltration of phytoplankton containing culture medium. Microfiltration of phytoplankton to produce a slurry, followed by pressing to further reduce the water content, produces a compressed cake of phytoplankton which is easy to manipulate. Microfiltration is the preferred method of harvesting cultured phytoplankton. Apparatus for centrifugation and microfiltration of phytoplankton can be obtained from, for example, U.S. Filter Co., Warrandale, Pa. The collected phytoplankton is then placed in plastic bags and frozen for a maximum of 30 days. When a pond needs to be seeded with phytoplankton, the phytoplankton is taken from the freezer in the early morning and deposited in the designated pond in an evenly dispersed pattern.

Growth of phytoplankton in the ponds 17 is fostered by the addition of nitrate and phosphate fertilizers. The amount of fertilizers added varies by season. In the summer season, from June to November, between about 6.6 to about 17.6 lbs per hectare of pond-size nitrogen-containing fertilizer (typically urea) is added when the ponds 17 are seeded with phytoplankton. Between about 3.3 and 11 lbs per hectare of pond-size phosphorous-containing fertilizer is also added to each pond 17 at the time of phytoplankton seeding. Subsequently, in order to maintain growth, between about 2.2 lbs to 11 lbs per hectare of nitrogen-containing fertilizer is added weekly to each pond 17. Phosphorous-containing fertilizer is added weekly at a rate of 1.1 lbs per hectare to 8.8 lbs per hectare.

In the winter season, from December to May, nitrogen-containing fertilizer is added when the ponds 17 are seeded with phytoplankton in amounts from 2.2 lbs to 8.8 lbs per hectare of pond 17. Phosphorous-containing fertilizer is added to the ponds 17 at the time of phytoplankton seeding in amounts from 2.2 lbs per hectare to 13.2 lbs per hectare. Subsequently, in order to maintain grog, nitrogen-containing fertilizer is added in amounts from 1.1 lbs per hectare to 6.6 lbs per hectare per week. Phosphorous-containing fertilizer is added to the ponds 17 weekly at a rate of 2.2 lbs per hectare to 11 lbs per hectare. As the shrimp mature in the grow-out ponds 17, they consume phytoplankton in greater quantities. Commercial pelletized shrimp feed, typically containing fish meal, squid, wheat, rice, fish oil, and vitamins is added to the ponds to supplement the phytoplankton food source. Table 2 indicates the typical quantities of pelletized feed that is introduced into a pond 17.

TABLE 2

| Days from Seeding | Cells/milliliter | lbs/hectare of feed |
| --- | --- | --- |
| 1-9 | 80,000 | 6.6 |
| 10-29 | 70,000 | 8.8 |
| 30-49 | 60,000 | 17.6 |
| 50-59 | 50,000 | 22 |
| 60-89 | 50,000 | 26.4 |
| 90-109 | 50,000 | 35.2 |
| 110-120 | 50,000 | 44 |

When the warehouse ponds are used to store very small postlarval shrimp and grow them to 0.5 to 1 g size before transfer to grow out ponds, harvesting is done as follows. The gates 20 of the ponds are opened and shrimp are collected in a crocheted tube, typically made of a marine netting material such as nylon, with an aperture size smaller than the shrimp. One end of the tube is tied off to collect the shrimp. The shrimp are immediately transferred to buckets filled with oxygenated water and are then immediately transferred to the grow out pond which is being stocked.

When the shrimp have grown to between about 9 and about 20 grams, and preferably between about 15 and 18 grams, they are harvested. Shrimp must be harvested at night, between about 6 PM and about 6 AM. During the day shrimp cling to the bottom of the ponds 16, 17, and thus will not flow out with the water when gates 18 are opened. In the evening, shrimp are present at the surface of the water and can be easily collected. Before harvesting the water levels of the ponds is dropped from about 110 cm to about 60 cm. Shrimp harvesting is carried out as follows: a crocheted tube (generally made of a marine netting material, such as nylon), with crocheted openings smaller than the shrimp to be harvested, is fastened at one end to the outflow tube 49 (see FIG. 6B) of a selected pond. The other end of the tube is tied in a knot to close off the end. The outflow gates 18 of ponds 17 are then opened, and the water and shrimp are permitted to flow out of the pond 17 by the action of gravity. The shrimp containing water flows through the tube into the recirculating canal 19, and shrimp are caught in the tube. After approximately 1500 to about 2000 pounds of shrimp are trapped in the tube, gate 18 is closed, the end of the tube is untied, and the shrimp packed, in layers, on ice. After the tube has been emptied, it is retied at one end and the same sequence of events is repeated until the pond 17 has been emptied and the shrimp have been collected and packed on ice. A typical 10 hectare pond will yield 9,000 to 11,000 lbs of shrimp.

The water that is drained from the ponds during harvesting of shrimp is not discarded, but rather is warehoused by raising the levels of other ponds 17, the recirculating canal 19, and the containment area 7. In one embodiment of the invention, the maximum amount of water that can be stored in this manner is 150 million gallons, corresponding to about 4 of the large, approximately 10 hectare ponds 17.

In practicing the invention, the emptied ponds 17 are examined for damage and acidification. If an area appears to have collected putrefying organic matter, it is treated with lime ($CaCO_3$). The ponds 17 are then allowed to dry out in the sun, until the bottom of the pond cracks. The pond is then refilled with water from the reservoir canal 14 to a height of 30 cm. This process of reconditioning and refilling a pond typically takes from about 7 to about 15 days. Ozone use shortens the time before the ponds surface cracks.

About 36 hours after refilling the ponds with water to a depth of 30 cm, they are reseeded with phytoplankton. On the third day following refilling, postlarval shrimp are added to the growout ponds 16. Over the next 20 days, the water level of the pond is allowed to rise from 30 cm to about 100–110 cm by letting water into the pond and not allowing any outflow. Between the 20th and the 25th day after refilling the ponds 17, water exchange via the reservoir canal 14 is begun. The warehouse ponds are refilled in the same manner as the grow-out ponds.

The open mariculture system described above is adapted to culturing shrimp. However, as known to those of ordinary skill in the art, and as is evident from the discussion above, the apparatus and method are generally applicable to culturing any aquatic or marine species. Both fresh and saltwater aquatic life can be cultured using the invention, because there is no limitation on the salt content of the water. Thus the invention can be used to greatly increase the available supply of many types of marine life which are currently in short supply as a result of overfishing and environmental destruction.

What is claimed is:

1. An open mariculture system comprising:
   a reservoir;
   a first ozone contacting device in selective fluid communication with said reservoir;
   a reservoir canal in selective fluid communication with said first ozone contacting device; and
   a plurality of ponds in selective fluid communication with said reservoir canal.

2. The mariculture system according to claim 1, further comprising a recirculating canal in selective fluid communication with said first ozone contacting device.

3. The mariculture system according to claim 2, further comprising a second ozone contacting device in selective fluid communication with said recirculating canal.

4. The mariculture system according to claim 3, wherein said plurality of ponds are in selective fluid communication with said recirculating canal.

5. The mariculture system according to claim 2, further comprising an activated carbon device in selective fluid communication with said first ozone contacting device and said recirculating canal.

6. The mariculture system according to claim 5, wherein said recirculating canal includes a containment area in fluid communication with said activated carbon device wherein replenishment and recirculating water are admixed.

7. The mariculture system according to claim 1, further comprising an activated carbon device in selective fluid communication with said first ozone contacting device.

8. The mariculture system according to claim 7, further comprising a containment area in fluid communication with said activated carbon device wherein replenishment and recirculating water are admixed.

9. The mariculture system according to claim 8, further comprising a sedimentation device in selective fluid communication with said containment area.

10. The mariculture system according to claim 9, further comprising a second ozone contacting device in selective fluid communication with said containment area, further comprising a second sedimentation device in selective fluid communication with said second ozone contacting device.

11. The mariculture system according to claim 10, further comprising an aeration device in selective fluid communication with said second sedimentation device; said aeration device being capable of removing hypobromous acid from ozone-treated bromine-containing water.

12. The mariculture system according to claim 11, wherein said aeration device includes a curtain depending downwardly from a top of said aeration device.

13. The mariculture system according to claim 12, wherein said curtain is made of a porous material.

14. The mariculture system according to claim 1, wherein said plurality of ponds each have an inlet gate, an activated carbon filter being disposed in each of said ponds proximate to said inlet gate.

15. A method of culturing marine life comprising the steps of:
   obtaining water from a natural water source;
   contacting said water with ozone;
   aerating said water until the content of residual byproducts of said contacting in said water has been reduced to a level compatible with marine life; and
   culturing marine life in said water.

16. A method of culturing marine life comprising the steps of:
   obtaining replenishment water from a natural water source which is contaminated with microorganisms or compounds harmful to said marine life;
   contacting said replenishment water with a first amount of ozone for a period of time sufficient so that said ozone reaches a first level in said replenishment water;
   combining said ozone-contacted replenishment water with recirculating water in which said marine life is cultured;
   aerating said combined replenishment and recirculating water until the content of residual byproducts of said ozone contacting in said water has been reduced to a level compatible with marine life; and
   culturing marine life in said water.

17. The method of claim 16 wherein said replenishment water is bromine-containing water from a natural water source.

18. The method of claim 17 wherein said replenishment water is contaminated with microorganisms or compounds harmful to said marine life.

19. The method of claim 17 wherein said marine life is cultured in a plurality of earthen ponds.

20. The method of claim 19 which further comprises inoculating said earthen ponds with phytoplankton.

21. The method of claim 20 which further comprises inoculating said earthen ponds with a paste derived from the ajo plant in a bactericidally effective amount.

22. The method of claim 16 wherein said combined replenishment and recirculating water is contacted with a second amount of ozone for a period of time sufficient so that said ozone reaches a second, lower level in said combined replenishment and recirculating water.

23. The method of claim 22 wherein prior to said combining of said recirculating water and said ozone-treated replenishment water, said ozone-treated replenishment water is contacted with activated carbon.

24. The method of claim 16 wherein said marine life is shrimp.

25. A method for preventing or at least ameliorating the deleterious effects of microorganisms and chemical toxins on a culture of marine animals suffering from such deleterious effects, comprising:

obtaining bromine-containing replenishment water from a natural water source which is contaiminated with microorganisms or compounds harmful to said marine life;

contacting said contaminated replenishment water with an amount of ozone and for a sufficient period of time to achieve a first level of ozone in said replenishment water, wherein said first level of ozone is effective to destroy microorganisms and chemical compounds harmful to said marine life;

combining the purified replenishment water with recirculating culture water;

contacting said combined replenishment water and recirculating culture water with a sufficient amount of ozone and for a sufficient period of time to achieve a second level of ozone in said water, wherein said second level of ozone is lower than said first level, and wherein said second level of ozone is also effective to destroy microorganisms and chemical compounds harmful to said marine life;

aerating said combined replenishment and recirculating water until the content of residual byproducts of said ozone contacting in said water has been reduced to a level compatible with marine life; and culturing marine life in said water.

26. The method of claim 25 wherein said culture of marine animals is suffering from Taura syndrome.

27. The method of claim 25 wherein said culture of marine animals is suffering from infection with microorganisms selected from the group consisting of parvovirus, baculovirus, Vibrio, and necrotizing hepatopancreatitis bacterium.

28. The method of claim 25 wherein said marine life is shrimp.

* * * * *